United States Patent
Nguyen et al.

(10) Patent No.: US 9,924,196 B2
(45) Date of Patent: Mar. 20, 2018

(54) INDEPENDENT THREAD VIDEO DISPARITY ESTIMATION METHOD AND CODEC

(71) Applicant: The Regents of the University of California, Oakland, CA (US)

(72) Inventors: Truong Nguyen, San Diego, CA (US); Ho Chan, La Jolla, CA (US); Jason Juang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/389,870

(22) PCT Filed: May 6, 2013

(86) PCT No.: PCT/US2013/039717
§ 371 (c)(1),
(2) Date: Oct. 1, 2014

(87) PCT Pub. No.: WO2013/173106
PCT Pub. Date: Nov. 21, 2013

(65) Prior Publication Data
US 2015/0071360 A1    Mar. 12, 2015

Related U.S. Application Data

(60) Provisional application No. 61/648,673, filed on May 18, 2012.

(51) Int. Cl.
*H04N 19/597* (2014.01)
*H04N 19/62* (2014.01)
*G06T 7/00* (2017.01)

(52) U.S. Cl.
CPC ............ *H04N 19/597* (2014.11); *G06T 7/97* (2017.01); *H04N 19/62* (2014.11); *G06T 2207/10021* (2013.01)

(58) Field of Classification Search
CPC .... H04N 19/597; H04N 19/62; G06T 7/0022; G06T 2207/10021
See application file for complete search history.

(56) References Cited

U.S. PATENT DOCUMENTS

| | | | |
|---|---|---|---|
| 7,324,687 B2 | 1/2008 | Zitnick, III et al. | |
| 8,179,448 B2 | 5/2012 | Chen et al. | |
| 2006/0013473 A1* | 1/2006 | Woodfill | G06K 9/32 382/154 |

(Continued)

OTHER PUBLICATIONS

Cigla et al. "Efficient Edge-Preserving Stereo Matching". 2011 IEEE International Conference on Computer Vision Workshops. 2011, pp. 696-699.*

(Continued)

*Primary Examiner* — Zhihan Zhou
(74) *Attorney, Agent, or Firm* — Greer, Burns & Crain, Ltd.; Steven P. Fallon

(57) ABSTRACT

A method for real-time disparity estimation of stereo video data receives sequence of frames of stereo video data. Image-based disparity estimation is initially conducted to produce initial disparity estimates, and the disparity estimates are refined in a space-time volume. The algorithm produces disparity via multi-thread process in which an output is independent of the input for each step of the process.

15 Claims, 7 Drawing Sheets

(56) References Cited

U.S. PATENT DOCUMENTS

| | | | |
|---|---|---|---|
| 2010/0218196 A1* | 8/2010 | Leung | G06F 8/453 718/107 |
| 2011/0032341 A1 | 2/2011 | Ignatov et al. | |
| 2011/0043604 A1* | 2/2011 | Peleg | G06T 3/4038 348/36 |
| 2011/0176722 A1 | 6/2011 | Sizintsev et al. | |
| 2012/0007954 A1 | 1/2012 | Miller et al. | |
| 2012/0317579 A1* | 12/2012 | Liu | G06F 11/1438 718/104 |

OTHER PUBLICATIONS

Chen et al. "CUDA-Based Genetic Algorithm on Traveling Salesman Problem". Computer and Information Science 2011, SCI 364, pp. 241-252.*

Banks, J., et al., "Fast and Robust Stereo Matching Algorithms for Mining Automation", Digital Signal Processing, vol. 9, Issue 3, Jul. 1999, pp. 137-148.

Bartczak, Bogumil, et al., "Real-Time Neighborhood Based Disparity Estimation Incorporating Temporal Evidence", in Proceedings of the DAGM symposium on Pattern Recognition, Lecture Notes in Computer Science vol. 5096, (2008), pp. 153-162.

Bleyer, M., et al. "Temporally Consistent Disparity Maps from Uncalibrated Stereo Videos", in Proceedings of the 6th International Symposium on Image and Signal Processing (2009), pp. 383-387.

Boykov, et al. "Fast Approximate Energy Minimization via Graph Cuts," IEEE Transactions on Pattern Analysis and Machine Intelligence, vol. 23, No. 11, (Feb. 2004), pp. 1222-1239.

Chan, Stanley, H., et al. "An Augmented Lagrangian Method for Total Variation Video Restoration", IEEE Transactions on Image Processing, vol. 20, No. 11, Nov. 2011, pp. 3097-3111.

Huguet, F., et al., "A Variational Method for Scene Flow Estimation from Stereo Sequences" Computer Vision, 2007. ICCV 2007. IEEE 11th International Conference on, Oct. 2007, pp. 1-7.

Ignatov, Artem, et al., "Disparity Estimation in Real-Time 3D Acquisition and Reproduction System", 19th International Conference on Computer Graphics and Vision, GraphiCon 2009, Oct. 2009, 8 pages.

Khoshabeh, Ramsin, et al., "Spatio-temporal consistency in video disparity estimation", Acoustics, Speech and Signal Processing (ICASSP), 2011 IEEE International Conference on, May 2011, pp. 885-888.

Kim, HanSung, et al., "Real-time disparity estimation using foreground segmentation for stereo sequences", Optical Engineering 45(03), (2006), 10 pages.

Kolmogorov, V., et al., "Computing Visual Correspondence with Occlusions via Graph Cuts", Computer Vision, 2001. ICCV 2001. Proceedings. Eighth IEEE International Conference on (vol. 2), Jul. 2001, pp. 508-515.

Kosov, Sergey, et al., "Accurate Real-Time Disparity Estimation with Variational Methods", International Symposium on Visual Computing, Lecture Notes in Computer Science vol. 5875, (2009), pp. 796-807.

Nvidia, "Nvidia Cuda C Programming Guide Version 3.1," Jun. 2010, 173 pages, https://web.archive.org/web/20110716144205/http://developer.download.nvidia.com/compute/cuda/3_1/toolkit/docs/NVIDIA_CUDA_C_ProgrammingGuide_3.1.pdf.

Richardt, C., et al., "Real-time Spatiotemporal Stereo Matching Using the Dual-Cross-Bilateral Grid", Computer Vision—ECCV 2010, Lecture Notes in Computer Science vol. 6313, (2010), pp. 510-523.

Scharstein, D., et al. "A Taxonomy and Evaluation of Dense Two-Frame Stereo Correspondence Algorithms", International Journal of Computer Vision, vol. 47, No. 1, Apr. 2002, pp. 7-42.

Williams, O., et al., "Estimating Disparity and Occlusions in Stereo Video Sequences," Computer Vision and Pattern Recognition Proceedings (2005), 8 pages.

Yoon, K.J., et al. "Locally Adaptive Support-Weight Approach for Visual Correspondence Search", Computer Vision and Pattern Recognition, 2005. CVPR 2005. IEEE Computer Society Conference on (vol. 2), Jun. 2005, pp. 924-931.

Zhang, G., et al., "Consistent Depth Maps Recovery from a Video Sequence", Pattern Analysis and Machine Intelligence, IEEE Transactions on, vol. 31, Issue 6, Jun. 2009, pp. 974-988.

Zhu, J., et al., "Fusion of Time-of-Flight Depth and Stereo for High Accuracy Depth Maps", Computer Vision and Pattern Recognition, 2008. CVPR 2008. IEEE Conference on, Jun. 2008, pp. 1-.

* cited by examiner

INDEPENDENT THREAD VIDEO DISPARITY ESTIMATION METHOD AND CODEC

STATEMENT OF GOVERNMENT INTEREST

This invention was made with government support under grant no. CCF-1065305 awarded by the National Science Foundation. The government has certain rights in the invention.

FIELD

A field of the invention is video encoding and decoding. Example applications of the invention include the encoding, storage, transmission, decoding and stereo video data, including 3D video processing. Methods and codecs of the invention are particularly application to view synthesis for multi-view coding that uses disparity estimation, 3D video conferencing, real time 3D video coding, real time object detection for surveillance, real time video tracking using stereo data, and real-time stereo to multiview rendering.

BACKGROUND

Disparity estimation is a necessary component in stereo video processing. Video disparity is used for 3D video processing. In a two-camera imaging system, disparity is defined as the vector difference between the imaged object point in each image relative to the focal point. It is this disparity that allows for depth estimation of objects in the scene via triangulation of the point in each image. In rectified stereo, where both camera images are in the same plane, only horizontal disparity exists. In this case, multiview geometry shows that disparity is inversely proportional to actual depth in the scene.

However, existing disparity estimation methods are largely limited to stereo images and have been shown effective or tailored for specific datasets such as Middlebury Stereo Vision Database. These methods are typically slow, and usually can only be applied to high quality images with high contrast, rich color and low noise. These methods typically require off-line processing and cannot be implemented in real time. Therefore, simply extending existing image-based methods to estimate video disparities is insufficient because video disparity does not only require spatial quality, but also temporal consistency. Additionally, real-time processing is required in many practical video systems.

Estimating disparity has been extensively studied for images. The existing image-based methods are ill-suited to video disparity estimation on a frame-by-frame basis because temporal consistency is not guaranteed. Using these methods for video disparity estimation often leads to poor spatial and temporal consistency. Temporal consistency is the smoothness of the disparity in time. If a video disparity is temporally consistent, then an observer will see flickering artifacts. Temporally inconsistent disparity degrades the performance of view synthesis and 3D video coding.

Existing disparity estimation methods are also tuned for specific datasets such as Middlebury stereo database. See, D. Scharstein and R. Szeliski, "A Taxonomy and Evaluation of Dense Two-Frame Stereo Correspondence Algorithms" International Journal of Computer Vision Proceedings, 47:7-42 (April 2002). Such methods tend to perform poorly when applied to real video sequences. Many common real video sequences have lighting conditions, color distributions and object shapes that can be very different from the images on Middlebury stereo database. For methods that require training, applying such methods to real videos is almost impossible and at least is highly impractical from a perspective of speed of execution and complexity of computation.

Existing image-based disparity estimation techniques may be categorized into one of two groups: local or global methods. Local methods treat each pixel (or an aggregated region of pixels) in the reference image independently and seek to infer the optimal horizontal displacement to match it with the corresponding pixel/region. Global methods incorporate assumptions about depth discontinuities and estimate disparity values by minimizing an energy function over all pixels using techniques such as Graph Cuts or Hierarchical Belief Propagation. Y. Boykov et al, "Fast Approximate Energy Minimization via Graph Cuts," IEEE Transactions on Pattern Analysis and Machine Intelligence, vol. 23, no. 11, pp. 1222-1239 (February 2004); V. Kolmogorov and R. Zabih, "Computing Visual Correspondence with Occlusions via Graph Cuts," International Conference on Computer Vision Proceedings, pp. 508-515 (2001). Local methods tend to be very fast but global methods tend to be more accurate. Most implementations of global methods tend to be unacceptably slow. See, D. Scharstein and R. Szeliski, "A Taxonomy and Evaluation of Dense Two-Frame Stereo Correspondence Algorithms," International Conference on Computer Vision Proceedings, vol. 47, pp. 7-42 (April 2002).

Attempts to solve stereo-matching problems for video have had limited success. Difficulties encountered have included the computational bottleneck of dealing with multidimensional data, lack of any real datasets with ground-truth, and the unclear relationship between optimal spatial and temporal processing for correspondence matching Most have attempted to extend existing image-methods to video and have produced computational burdens that are impractical for most applications.

One attempt to extend the Hierarchical Belief Propagation method to video extends the matching cost representation to video by a 3-dimensional Markov Random Field (MRF). O. Williams, M. Isard, and J. MacCormick, "Estimating Disparity and Occlusions in Stereo Video Sequences," in Computer Vision and Pattern Recognition Proceedings (2005). Reported algorithmic run times were as high as 947.5 seconds for a single 320×240 frame on a powerful computer, which is highly impractical.

Other approaches have used motion flow fields to attempt to enforce temporal coherence. One motion flow field technique makes use of a motion vector field. F. Huguet and F. Devernay, "A Variational Method for Scene Flow Estimation from Stereo Sequences," in International Conference on Computer Vision Proceedings pp. 1-7 (2007). Another makes use of See, M. Bleyer and M. Gelautz, "Temporally Consistent Disparity Maps from Uncalibrated Stereo Videos," in Proceeings of the 6$^{th}$ International Symposium on Image and Signal Processing (2009).

One computationally practical method is a graphics processing unit (GPU) implementation of Hierarchical Belief Propagation that relies upon locally adaptive support weights. See, C. Richardt et al, "Realtime Spatiotemporal Stereo Matching Using the Dual-Cross-Bilateral Grid," in European Conference on Computer Vision Proceedings (2010); K. J. Yoon and I. S. Kweon, "Locally Adaptive Support-Weight Approach for Visual Correspondence Search," in Computer Vision and Pattern Recognition Proceedings (2005). This method integrates temporal coherence in a similar way to Williams et al. (O. Williams, M. Isard, and J. MacCormick, "Estimating Disparity and Occlusions in Stereo Video Sequences," in Computer Vision and Pattern Recognition Proceedings (2005)) and also provides a synthetic dataset with ground-truth disparity maps. Other methods that are practical require specific hardware or place data constraints. See, J. Zhu et al, "Fusion of Time-of-Flight Depth and Stereo for High Accuracy Depth Maps," in Computer Vision and Pattern Recognition Proceedings (2008) pp. 1-8; G. Zhang, J. Jia, T. T. Wong, and H. Bao, "Consistent Depth Maps Recovery from a Video Sequence," PAMI, vol. 31, no. 6, pp. 974-988 (2009).

SUMMARY OF THE INVENTION

An embodiment of the invention is a method for disparity estimation of stereo video data. Image-based disparity estimation is initially conducted to produce initial disparity estimates, and the initial disparity estimation produces disparity estimates via a thread process in which each output is generated independently. Disparity estimates are refined in a space-time volume.

DETAILED DESCRIPTION OF THE PREFERRED EMBODIMENTS

Figure 1:
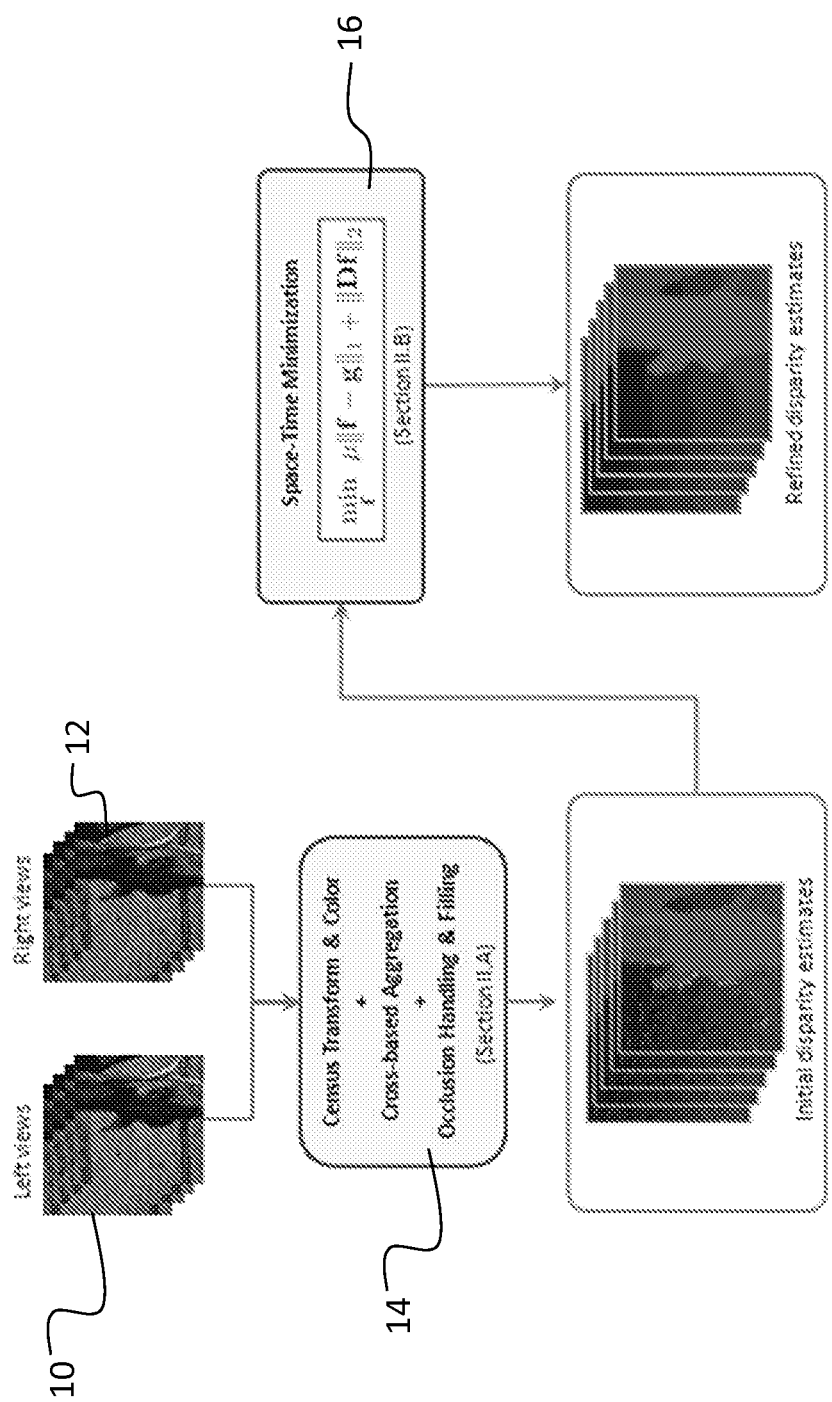
FIG. 1 is a block diagram of a preferred method and device of the invention for independent thread video disparity estimation.

An embodiment of the invention is a method that can provide disparity estimation using independent threads. Left and right stereo views are received from a stereo sensor system or other stereo video sources. The method conducts an initial disparity estimation followed by a refinement of the initial disparity estimation. In the initial estimation, a shape adaptive aggregation is applied to compute the initial image-based disparity map, which provides high matching accuracy. The preferred initial estimation is an image-based disparity estimation that combines census transform and color, cross-based aggregation, and occlusion handling and filling. Other known methods can also be used for initial disparity estimation, and the space-time minimization of the invention can be used with any other methods. However, experiments conducted show that the shape adaptive aggregation method provides the best tradeoff between quality and speed. Refinement is conducted with a space-time minimization that enforces spatio-temporal consistency between frames. The initial disparity estimation and refinement are constructed to enable parallel processing, and permit independent thread processing. In each step of the preferred method, the output is independent of the input, which therefore allows multithread processing. For example, when calculating census transform for pixel (x,y), the resulting bit string is not dependent on the resulting bit string for other pixel (x',y'). This enables preferred embodiments to operate in real-time with appropriate hardware and thread processing.

Temporal consistency (and spatial consistency) is improved by solving a space-time minimization using a spatio-temporal total variation (TV) regularization. Treating the initial video disparity as a space-time volume, the space-time TV enforces sparsity of the spatial and temporal gradient in the space-time volume. The minimization problem is solved using an augmented Lagrangian method. Experimental results verify that the method performs very well in comparison to existing methods known to the inventors. Methods of the invention produce spatially and temporally consistent results in real time, whereas prior real time methods provide only spatial consistency and can suffer from temporal inconsistencies.

A preferred embodiment codec of the invention can be implemented with standard graphics processors and achieve real-time performance. An example system to demonstrated the method of the invention was implement in dual nVidia graphics cards (GTX 580). A preferred method of the invention has been demonstrated to be robust to various types of inputs that are non-ideal. Many prior methods are effective only with idealized video sets, and many are only suitable for image processing. The present method is robust for inputs such as for compressed movie trailers, stereo footage from DaVinci surgery system, and stereo video captured from everyday life.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

A preferred method of the invention will be discussed with respect to FIG. 1. The method can be implemented, for example, via computer code stored on a non-transient medium. It can be implemented in hardware or firmware, and as a codec, in various video capture and processing devices. Example devices include augmented reality systems, human computer interaction devices, and gaming or entertaining devices such as Microsoft Kinect. Additional particular example devices include HTC EVO 3D and LG 3DTV, which can use the disparity estimation of the invention to create different depth sensation on the stereo displays of these devices. Another example device is the Alioscopy multiview display, which could use the disparity estimation of the invention to synthesize multi-virtual views.

In the method of FIG. 1, a stereo video (left sequence 10 and right sequence 12) is input to an image-based disparity estimation algorithm 14. The initial estimation is done frame by frame but using the right and left frame together. This estimation algorithm preferably includes minimization via a method such as census transformation and/or color intensity methods, cross based aggregation and occlusion handling and filling. The occlusion handling and filling is unique in that pixels are made independent so that processing can proceed in parallel. The occlusion handling and filling is not as accurate as some methods that have input-output dependence, but subsequent spatio-temporal refinement 16 relieves and compensates for a lesser amount of accuracy. The spatio-temporal refinement enforces sparsity of the spatial and temporal gradient in a space-time volume, and the minimization can be expediently solved with an augmented Lagrangian method.

Initial Disparity Estimation 14

For a pair of video sequences and $I_L(x)$ and $I_R(x)$ where $x=(x,y)$, the goal of disparity estimation is to determine the correspondence map $d(x)$ such that the error $$\epsilon = \text{dist}(I_L(x+d(x)), I_R(x))$$

is minimized for some distance function $\text{dist}(\bullet,\bullet)$. The distance function can be defined globally (i.e., over the entire image), or locally (i.e., partition the image into blocks so that $\epsilon$ varies for different blocks). For each class, it can further be divided into pixel ordering methods (e.g., using census transform) and color intensity based methods (e.g., using sum of absolute difference). The distance function used is preferably a combination of census transform and color intensity methods.

Census Transform and Color Intensity Method

The census transform (CT) is a non-parametric local transform. It relies on the relative ordering of local intensity values, instead of the color intensity values. See, e.g., R. Zabih and J. Woodfill, "Non-Parametric Local Transforms for Computing Visual Correspondence," European Conference on Computer Vision 1994, pp. 151-158 (1994). For a given image, first convert the color pixels into gray-scale, Taking m=3 as an example, the following window is census transformed as $$\begin{bmatrix} 149 & 160 & 230 \\ 153 & 154 & 156 \\ 156 & 157 & 152 \end{bmatrix} \rightarrow \begin{bmatrix} 0 & 1 & 1 \\ 0 & x & 1 \\ 1 & 1 & 1 \end{bmatrix}$$

Given two census transformed blocks (each of size to m×m), the hamming distance, which is the logical XOR operation between the two blocks following by the sum of non-zero entries, can be used to determine the cost between them. For example, $$\text{hamming}\left\{\begin{bmatrix} 0 & 1 & 1 \\ 0 & x & 1 \\ 1 & 1 & 0 \end{bmatrix}, \begin{bmatrix} 0 & 0 & 0 \\ 1 & x & 1 \\ 1 & 1 & 0 \end{bmatrix}\right\} = 3.$$

The cost can be written as:

$$\text{Cost}_{CT}(I_L(x), I_R(x)) = \text{hamming}(\text{census}(I_L(x)), \text{census}(I_L(x)))$$

The Sampling insensitive absolute difference (BT) can be used to compute the color cost between pixels by considering the subpixels. For example, when computing cost between two pixels $I_L(x,y)$ and $I_R(x,y)$, it calculates the absolute color difference between $(I_L(x-0.5,y), I_R(x,y))$, $(I_L(x,y), I_R(x,y))$, $(I_L(x+0.5,y), I_R(x,y))$, $(I_L(x,y), I_R(x-0.5,y))$, $(I_L(x,y), I_R(x+0.5,y))$ and select the minimum.

The cost can be written as $\text{Cost}_{BT}(I_L(x), I_R(x)) = BT(I_L(x), I_R(x))$ Both the cost of census transform and color can be normalized to 0~1 by an exponential function. The distance function also needs to be constructed such that error values are calculated independently. Therefore, the distance function $\text{dist}(\bullet,\bullet)$ is defined as $$\text{dist}(I_L(x), I_R(x)) = \frac{1}{2}\left(1 - \exp\left(-\frac{\text{Cost}_{CT}(I_L(X), I_R(X))}{\lambda_{CT}}\right) + 1 - \exp\left(-\frac{\text{Cost}_{BT}(I_L(X), I_R(X))}{\lambda_{BT}}\right)\right)$$

$\text{dist}(I_L(x), I_R(x))$ is not dependent on $\text{dist}(I_L(x+x'), I_R(x+x'))$, therefore, for every $x$, $\text{dist}(I_L(x), I_R(x))$ can be computed at the same time independently.

At each pixel location $(x,y)$, a range of disparity $d\in\{d_{min}, \ldots, d_{max}\}$ is tested and a three-dimensional error map $$\epsilon(x;d) = \text{dist}(I_L(x+d(x)), I_R(x))$$

is generated. This is three dimensional in the sense of $(x,y,d)$ instead of $(x,y,t)$, so it is still frame by frame at this point in the initial disparity estimation. When correspondence between left and right views are found for a pixel $(x,y)$, there will be multiple candidates $d$. The goal is to find the $d$ that minimizes the cost. After we select our $d$ we have a initial disparity map, and then we apply our spatio-temporal refinement.

Cross-Based Aggregation

The result of the distance function above is a three-dimensional map of errors where each error value is calculated independently. This independence is important for leveraging parallel processing. While it is possible to infer the disparity (at each pixel $(x,y)$) by picking the disparity that return the smallest error, i.e., $$d(x) = \underset{d}{\operatorname{argmin}}\ \varepsilon(x;d)$$

the result can be noisy as each pixel is independent of its neighborhoods. Cross-based aggregation is applied to enhance spatial smoothness. Other smoothing enhancements can be also used. However, typical methods such as fixed block aggregation can cause edge smearing effects, locally adpative weight methods can be computationally expensive because aggregating would be caused in two dimensions at the same time. Experiments showed the cross based aggregation provide best trade-off in speed and quality.

Cross-based aggregation starts with a color image. For simplicity of explanation and without loss of generality, this explanation focuses on the left image, and denotes it as $I(x)$. At each color pixel $x_p=(x_p, y_p)$, the goal is to define a neighborhood $U(x_p)$ such that for all pixels in $U(x_p)$ the colors are similar. To this end, first define the top margin of $U(x_p)$ to be the nearest vertical pixel such that the color difference is less than a threshold $\tau$:

$$v_p^+ = \min_{x_q}\{x_q \mid \|I(x_p) - I(x_q)\|_\infty < \tau, x_q \in \text{positive vertical direction}\}$$

Where $\|\bullet\|_\infty$ is the maximum of the three color components of $I(x)$. Similarly, the bottom margin of $U(x_p)$ is defined as:

$$v_p^+ = \min_{x_q}\{x_q \mid \|I(x_p) - I(x_q)\|_\infty < \tau, x_q \in \text{positive vertical direction}\}$$

The top and bottom margin defines a vertical strip of pixels labeled as $\{v_p^-, \ldots, v_p^+\}$.

$$v_p^- = \min_{x_q}\{x_q \mid \|I(x_p) - I(x_q)\|_\infty < \tau, x_q \in \text{negative vertical direction}\}$$

Figure 2:
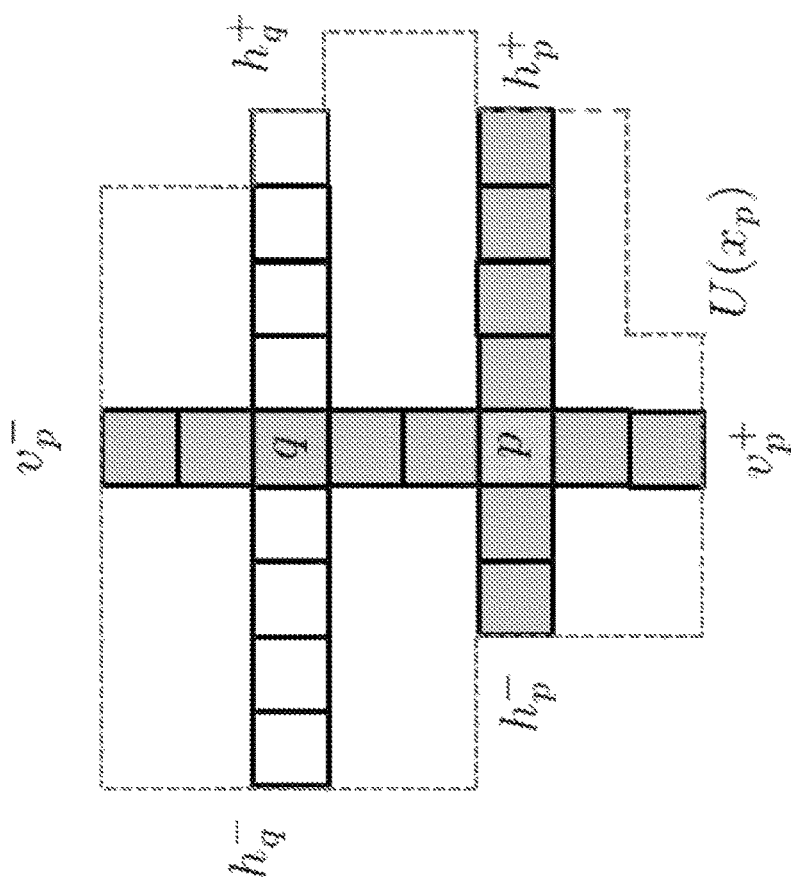
FIG. 2 illustrates an example cross-based aggregation time disparity estimation that is part of an initial disparity estimation in a preferred embodiment of the invention.

FIG. 2 illustrates an example cross-based aggregation. For each pixel $x_q \in \{v_p^-, \ldots, v_p^+\}$ calculate the horizontal margins with respect to each $x_q$ as follows:

$$h_q^+ = \min_{x_r} \{x_r \mid \|I(x_q) - I(x_r)\|_\infty < \tau, x_r \in \text{positive horizontal direction}\}$$

$$h_q^- = \min_{x_r} \{x_r \mid \|I(x_q) - I(x_r)\|_\infty < \tau, x_r \in \text{negative horizontal direction}\}$$

FIG. 2 graphically illustrates the definitions. The horizontal margin is defined for each $x_q \in \{v_p^-, \ldots, v_p^+\}$. Thus, there is a set of horizontal margins defined by each $x_q \in \{v_p^-, \ldots, v_p^+\}$. The union of all the horizontal margins defines the neighborhood $U(x_p)$.

With the aid of cross-based aggregation, a non-uniform average of the three-dimensional error map is calculated. Specifically, for each pixel location $x_p = (x_p, y_p)$ take the average of error value $\epsilon(x; d)$ within the neighborhood $U(x_p)$:

$$C(x_p; d) = \frac{1}{|U(x_p)|} \sum_{x_q \in U(x_p)} \varepsilon(x_q; d),$$

where $|U(x_p)|$ is the cardinality of the set $U(x_p)$. The disparity can be determined by picking the d's that minimizes the cost at each pixel location $x_p$:

$$d(x_p) = \underset{d}{\mathrm{argmin}}\, C(x_p; d)$$

Occlusion Handling and Filing

The cross-based aggregation returns disparity maps for the left and right images independently. To make sure that both left and right disparities are spatially consistent, perform a left-right consistency check to detect unreliable pixels. These unreliable pixels are those having different disparity on the left and right images.

Figure 3:
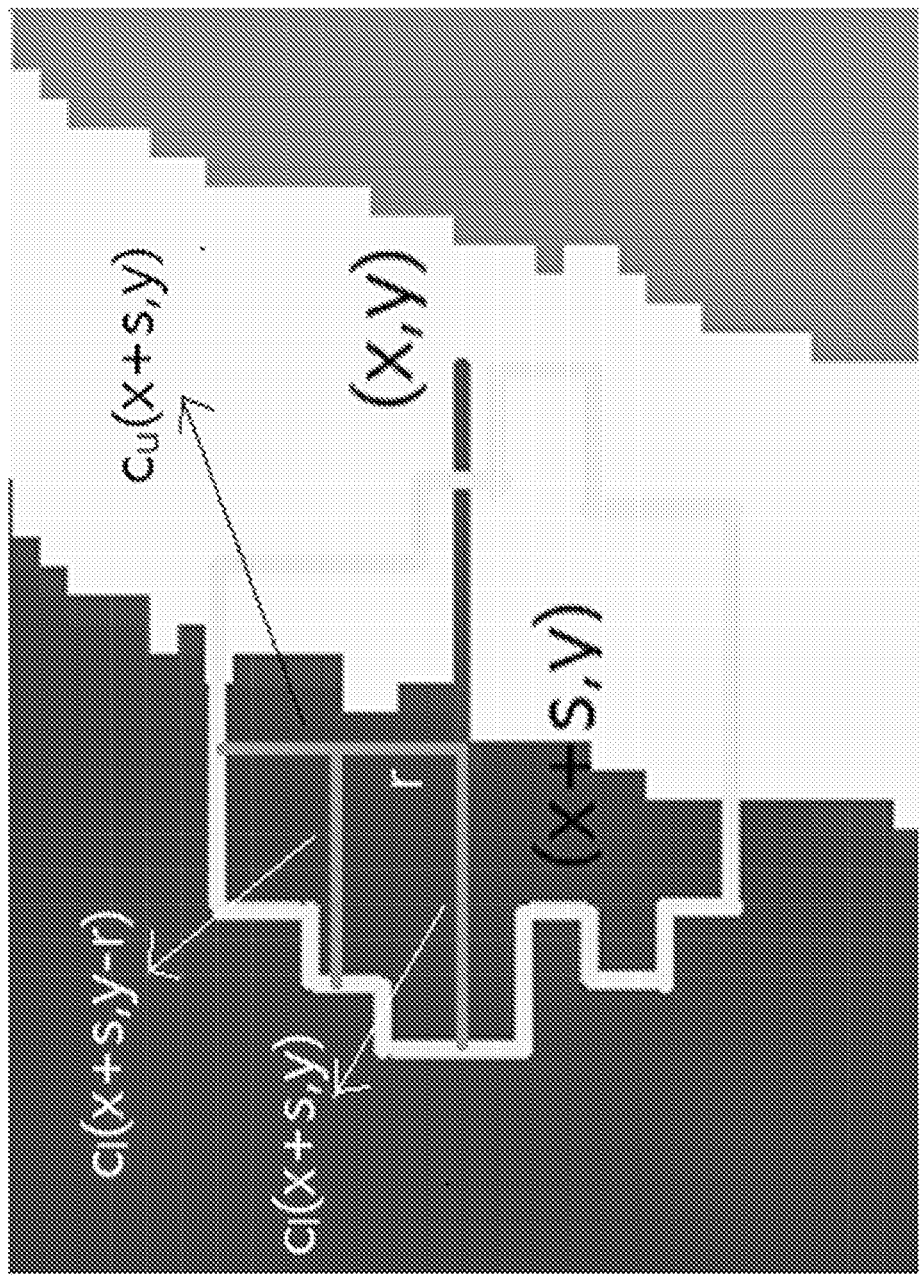
FIG. 3 illustrates an example occlusion handling that is part of an initial disparity estimation in a preferred embodiment of the invention.

FIG. 3 illustrates an example occlusion handling. In FIG. 3, for each unreliable pixel (x,y), the cross-based aggregation method generates a neighborhood for (x+s,y) as shown for the yellow region in FIG. 3, where (x+s,y) is the left most reliable pixel. The white region indicates unreliable (occluded) region, dark grey region is background, and the light grey region is the foreground. All reliable pixels within the neighborhood vote for the candidate disparity value at (x,y). The unreliable pixel at (x,y) is filled with the majority of the reliable pixel in the voting region. By this method of the invention, the center pixel in the method is not automatically selected as the center pixel for occlusion handling. Instead, a first occluded pixel is selected to define the neighborhood.

In FIG. 3, a left disparity map is used as an example, where occlusion pixels (white) appears at the right side of the background, left side of the foreground. (In the right image, occlusion pixels would appear at the left side of the background, right side of the foreground). Only the occlusion pixels are selected and needed to be processed. For an arbitrary occlusion pixel (x,y), the method goes to its left neighbor pixel to see whether it is an non occluded pixel. If it is occluded, continue to the left. If it is non-occluded, the procedure stops. In FIG. 3, the pixel being examined, the process went left for s pixels. A neighborhood is constructed based on the cross-based aggregation method on point (x+s,y). Every non occluded pixel within that region votes. The majority disparity values in that region is assigned to occlusion pixel (x,y). FIG. 3 presents an ideal situation where the majority is obviously the background. Therefore the white region will be filled with the background. The resulting filling for every occluded pixel (x,y) is independent of other filling result for occluded pixel (x+x',y+y'). This permits parallel processing.

Prior window based voting methods have been based on (x,y) instead of (x+s,y). The amount of non occlusion pixels in the window constructed based on (x,y) will be significantly smaller than the window constructed based on (x+s, y). Therefore, such methods are much more sensitive to outliers due to fewer votes, and resulting in inaccuracy.

Other methods such as plane fitting use RANSAC for multiple disparity planes, which is very computationally expensive. It is an iterative process (in the order of 100 per plane) that treats the occlusion pixel as outliers and find the plane that minimize the error for non occlusion regions, and fill the occlusion pixel as if it is on the plane.

Disparity Spatio-Temporal Refinement Real-Time

Refinement 16 involves solving the following minimization problem $$\underset{f}{\mathrm{minimize}}\, \mu\|f - g\|_1 + \|Df\|_2$$

where g=vec(g (x, y, t)) and f=vec(f (x, y, t)) are the initial disparity and the optimization variable, respectively. The operator D is the spatial-temporal gradient operator that returns horizontal, vertical, and temporal forward finite difference of f, i.e., $$D = [D_x^T, D_y^T, D_t^T]^T$$

To control relative emphasis on each direction, we modify $$D = [\beta_x D_x^T, \beta_y D_y^T, \beta_t D_t^T]^T$$

where $(\beta_x, \beta_y, \beta_t)$ are scaling parameters. These could be defined by users or set according to particular devices. If no user input is detected, betas can use a default setting, e.g. Defaults are $\beta_x=1$, $\beta_y=1$, $\beta_t=10$. These values can be determined and optimized experimentally for different types of video and sensor devices. The term $\|DF\|_2$ denotes the total variation norm, defined as $$\|Df\|_2 \overset{def}{=} \sum_i \sqrt{\beta_x^2 |D_x f|_i^2 + \beta_y^2 |D_y f|_i^2 + \beta_t^2 |D_y f|_i^2}.$$

An augmented Lagrangian method solves the above minimization problem by the following steps (at k-th iteration). See, Chan et al., "An Augmented Lagrangian Method for Video Restoration", IEEE International conference on acoustics, speech and signal processing (ICASSP), 2011

$$f_{k+1} = \underset{f}{\mathrm{argmin}}\, \frac{\rho_o}{2}\|r_k - f + g\|^2 + (\rho_r/2)\|u_k - Df\|^2 + z_k^T f + y_k^T Df,$$

$$v_{k+1} = \beta Df_{k+1} + \frac{1}{\rho_r} y_k,$$

$$u_{k+1} = \max\left\{|v_{k+1}| - \frac{1}{\rho r}, 0\right\} \cdot \frac{v_{k+1}}{\|v_{k+1}\|_2}$$

-continued $$r_{k+1} = \max\left\{\left|f_{k+1} - g + \frac{1}{\rho_o}z_k\right| - \frac{\mu}{\rho_o}, 0\right\} \cdot \text{sign}\left(f_{k+1} - g + \frac{1}{\rho_o}z_k\right),$$

$$y_{k+1} = z_k - \rho_r(u_{k+1} - Df_{k+1})$$

$$y_{k+1} = z_k - \rho_o(r_{k+1} - f_{k+1} + g),$$

In the iterative method described above, the first problem (known as the f-subproblem) can be solved using Fast-Fourier Transform, as discussed in Chan 2011, et al, supra. It is also possible to solve the problem using the following iteration (known as the Jacobi Iteration)

$$f_{i,j,k} =$$
$$C_2[\beta_x^2(f_{i-1,j,k} + f_{i+1,j,k}) + \beta_y^2(f_{i,j-1,k} + f_{i,j+1,k}) + \beta_t^2(f_{i,j,k-1} + f_{i,j,k+1})] +$$
$$C_2[\beta_x(u^x_{i-1,j,k} - u^x_{i,j,k}) + \beta_y(u^y_{i,j-1,k} - u^y_{i,j,k}) + \beta_t(u^t_{i,j,k-1} + u^t_{i,j,k})] +$$
$$C_3[\beta_x(y^x_{i-1,j,k} - y^x_{i,j,k}) + \beta_y(y^y_{i,j-1,k} - y^y_{i,j,k}) + \beta_t(u^t_{i,j,k-1} + y^t_{i,j,k})] +$$
$$C_1(g_{i,j,k} + r_{i,j,k}) - C_3 z_{i,j,k},$$

where $$C_1 = \frac{\rho_o}{\rho_o + K}, C_2 = \frac{\rho_r}{\rho_o + K},$$

$$C_3 = \frac{1}{\rho_o + K}, K = 2\rho_r(\beta_x^2 + \beta_y^2 + \beta_t^2).$$

The method described above requires multiple frames for the minimization. In another preferred embodiment of the invention, the minimization process is accomplished via a technique that does not multiple frames. Thus, the minimization problem can be solved faster.

The minimization is modified such that the minimization is $$\underset{f}{\text{argmin}}\, \mu \|Af - b\|_1 + \|D\hat{f}\|_2$$

where, $$A \text{ is } \begin{pmatrix} 1 \\ \kappa B \end{pmatrix} \text{ and } b \text{ is } \begin{pmatrix} g \\ \kappa \hat{f} \end{pmatrix}.$$

which can be solved using augmented Lagrangian+Jacobi Iteration. Here, f is the desired disparity, and g is the initial disparity. L1 norm is chosen in the objective function as it preserves the piecewise constant structure of the disparity f. The second term is the total variation of f in space. The total variation norm is used to preserve the edges and suppress the noise. The third term is the difference between the current estimate and the previous solution, which enforces temporal consistency. B is a diagonal matrix whose (i,i)th element=1 if there is no motion at pixel i, and =0 otherwise.

An example solution is provided as follows:

The augmented Lagrangian function is given by $$L(f, r, u, y, z) = \mu \|r\|_1 + \|u\|_2 - z^T(r - Af + b) +$$
$$\frac{\rho_o}{2}\|r - Af + b\|_2^2 - y^T(u - Df) + \frac{\rho_r}{2}\|u - Df\|_2^2$$

This can be broken into sub-problems:
f-sub:

$$\underset{f}{\text{argmin}}\, z^T Af + \frac{\rho_o}{2}\|r - Af + b\|_2^2 + y^T Df + \frac{\rho_r}{2}\|u - Df\|_2^2$$

u-sub $$\underset{u}{\text{argmin}}\|u\|_2 - y^T u + \frac{\rho_r}{2}\|u - Df\|_2^2$$

r-sub $$\underset{r}{\text{argmin}} = \mu\|r\|_1 - z^T r + \frac{\rho_o}{2}\|r - Af + b\|_2^2$$

Update:

$$y^{k+1} = y^k - \rho_r(u^{k+1} - Df^{k+1})$$

$$z^{k+1} = z^k - \rho_o(r^{k+1} - Af^{k+1} + b)$$

F-SUB Problem—
Normal Equation:

$$(\rho_o A^T A + \rho_r D^T D)f = \rho_o A^T(b+r) - A^T z + D^T(\rho_r u - y)$$

Express this explicitly using $$D = [D_x^T D_y^T]^T, r = [r_1^T r_2^T]^T, z = [z_1^T z_2^T]^T,$$

$$A = \begin{pmatrix} I \\ \kappa B \end{pmatrix} \text{ and } b = \begin{pmatrix} g \\ \kappa \hat{f} \end{pmatrix},$$

we have $$(\rho_o(1 + \kappa^2 B^T B) + \rho_r D^T D)f = \rho_o(g + \kappa^2 B^T \hat{f} + r_1 + \kappa B^T r_2) -$$
$$(z_1 + \kappa B^T z_2) + D_x^T(\rho_r u_x - y_x) + D_y^T(\rho_r u_y - y_y)$$

Jacobi Method—

$$f^{k+1}_{(i,j)} = \frac{\rho_r}{\rho_o(1 + \kappa^2 B_{(i,j)}^2) + 4\rho_r}(f^k_{(i+1,j)} + f^k_{(i-1,j)} + f^k_{(i,j+1)} + f^k_{(i,j-1)}) +$$
$$\frac{\rho_o}{\rho_o(1 + \kappa^2 B_{(i,j)}^2) + 4\rho_r}\left(g^k_{(i,j)} + \kappa B_{(i,j)}\hat{f}^k_{(i,j)} + r^k_{1(i,j)} + \kappa B_{(i,j)}r^k_{2(i,j)}\right) +$$
$$\frac{\rho_r}{\rho_o(1 + \kappa^2 B_{(i,j)}^2) + 4\rho_r}(u^k_{x(i-1,j)} - u^k_{x(i,j)} + u^k_{y(i-1,j)} - u^k_{y(i,j)}) -$$
$$\frac{1}{\rho_o(1 + \kappa^2 B_{(i,j)}^2) + 4\rho_r}$$
$$(y^k_{x(i-1,j)} - y^k_{x(i,j)} + y^k_{y(i-1,j)} - y^k_{y(i,j)} + z^k_{1(i,j)} + \kappa B_{i,j} z^k_{2(i,j)})$$

U-Sub Problem
Using the Shrinkage Formula $$u_x = \max\left\{\sqrt{|v_x^2| + |v_y^2|} - \frac{1}{\rho}, 0\right\}\frac{v_x}{\sqrt{|v_x^2| + |v_y^2|}}$$

$$v_x = D_x f + \frac{1}{\rho}y_x$$

$$u_y = \max\left\{\sqrt{|v_x^2| + |v_y^2|} - \frac{1}{\rho}, 0\right\}\frac{v_y}{\sqrt{|v_x^2| + |v_y^2|}}$$

$$v_y = D_y f + \frac{1}{\rho}y_y$$

R-Sub Problem $$r = \max\left\{\left|Af - b + \frac{1}{\rho_o}z\right| - \frac{\mu}{\rho_o}, 0\right\}\text{sign}\left(Af - b + \frac{1}{\rho_o}z\right)$$

Example Parameter Selection

Set $\rho_o=2, \rho_r=10$.

Every variable mentioned in this section is a matrix. Every operation is element wise. For example, f−g means for every element f(x,y)−g(x,y), where x ranges from 0~matrix width, y ranges from 0~matrix height. Obviously every element (pixel) is independent in this operation. Another example Bf means for every element B(x,y)*f(x,y), which is obviously also independent. All the computation in this section is just a combination of elementwise +−*/.

Parallel GPU Computing with Kernels

Figure 4:
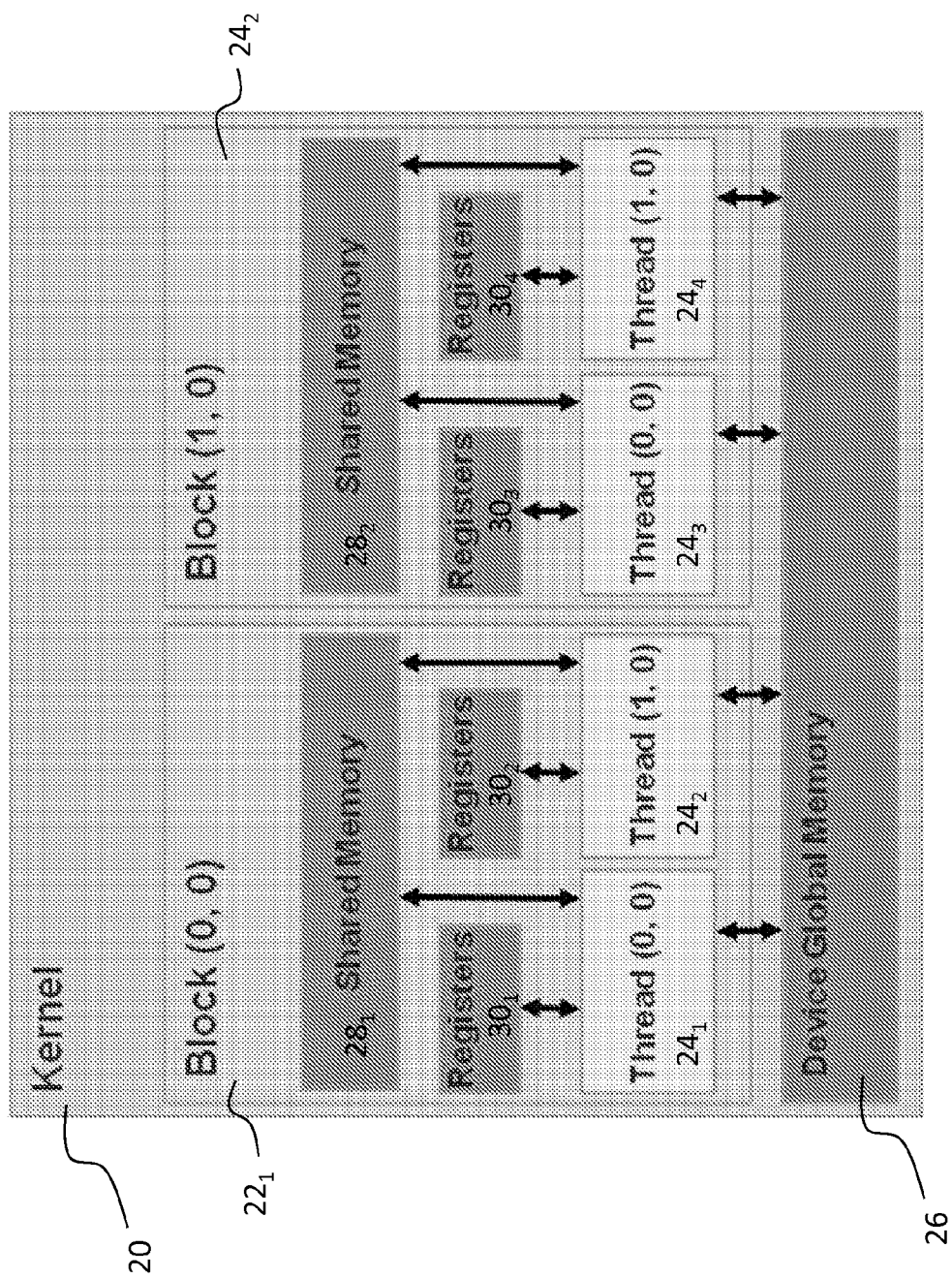
FIG. 4 shows a preferred processing architecture in GPU to achieve real-time disparity estimation using Compute Unified Device Architecture (CUDA)

FIG. 4 shows a preferred processing architecture in GPU to achieve real-time disparity estimation using Compute Unified Device Architecture (CUDA). Methods of the invention leverage GPU cores. Typically GPUs provide numerous cores. The NVIDIA GTX 580 is an old model that has 512 cores in each. That means we are using 1024 cores to do real time. The newest NVIDIA GTX 680 has 1536 cores. CUDA exploits the massive parallel computing ability of GPU by invoking kernels. In FIG. 4, a programmer specified kernel 20 contains multiple number of blocks $22_N$, and each block contains multiple threads $24_N$. "N" is an independent moniker for each separate use in FIG. 4, and as indicated in FIG. 4, does not indicate that the number of blocks is equal to the number of threads. The programmer specifies how many blocks and threads are allocated to the kernel. The optimal decision is affected by different models of GPU. For example, GTX 260 is only capable of invoking 512 threads per block, while GTX 580 is capable of invoking 1024 threads per block. If we use the old settings for GTX 260 allocating only 512 threads per block on GTX 580, the speed will be much slower than allocating 1024 threads per block.

CUDA distributes blocks randomly to idle streaming processor cores to compute. Every block $22_N$ has access to global memory 26, but the read/write calls for the global memory 26 should be minimized. Accessing it is slow because it is uncached. Each block has its own shared memory $28_N$ and registers $30_N$ for each thread. Read/Write for the shared memories $28_N$ and registers $30_N$ is very fast, but the size is very limited.

Clever usage for both the global memory and shared memory/register is therefore crucial for maximize speed up. The initial disparity estimation 14 and real-time refinement 16 are decomposed into various number of kernels and executed in parallel fashion. Dual GPU can be used to speed up the process.

Figure 5A:
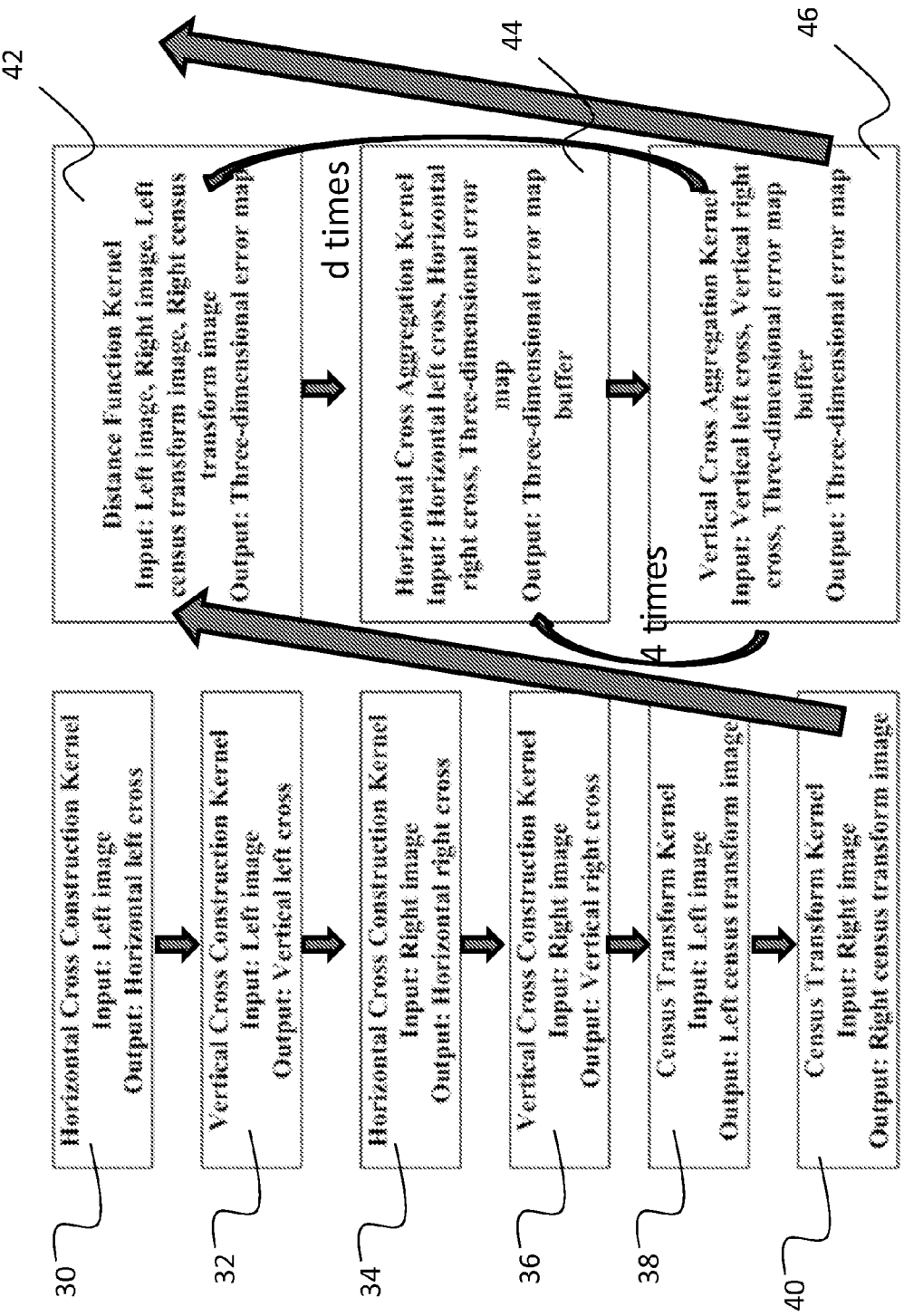
FIG. 5A-5C is a flowchart illustrating preferred steps for handling kernels in a GPU executing a method of the invention.
Figure 5B:
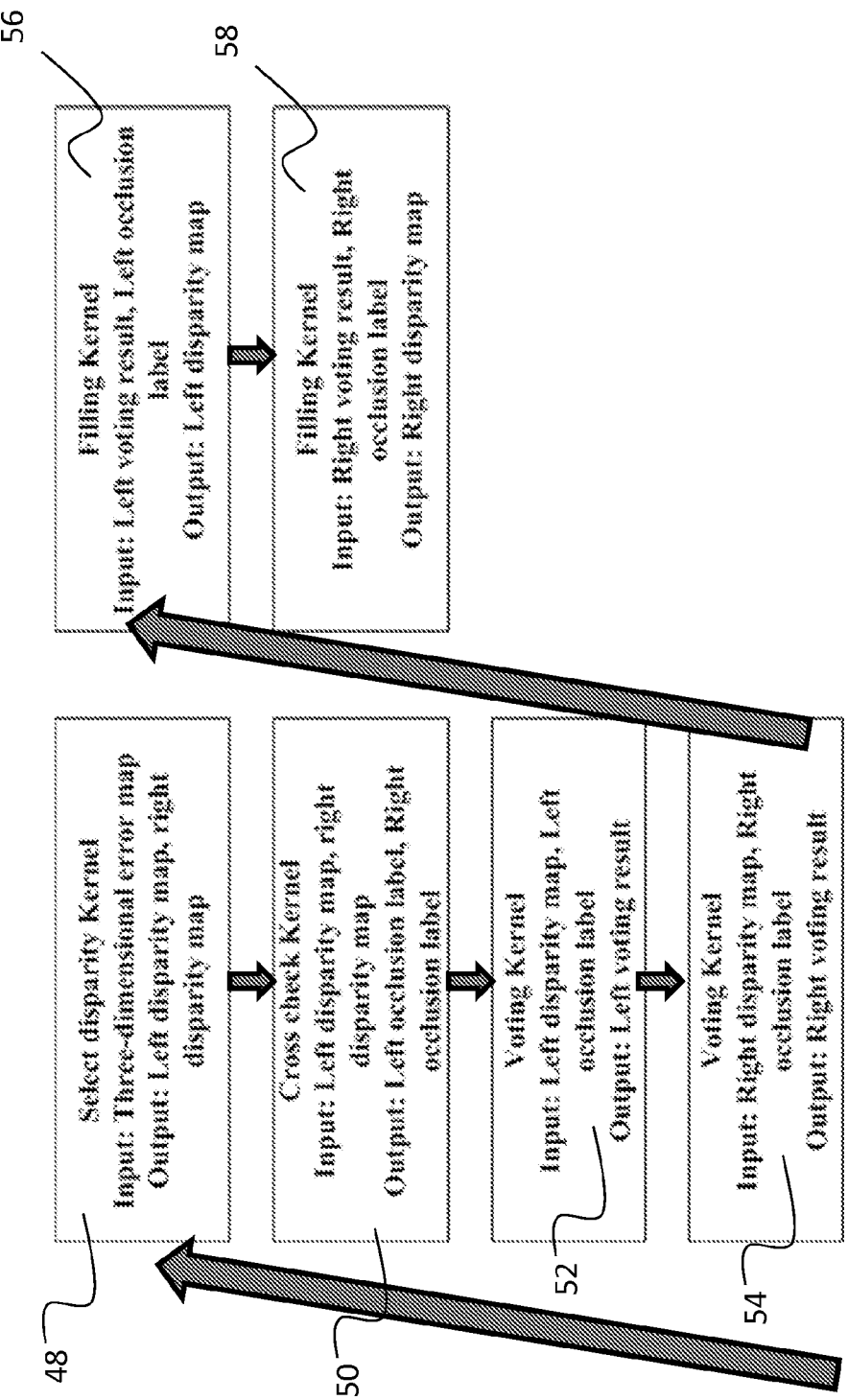
Figure 5C:
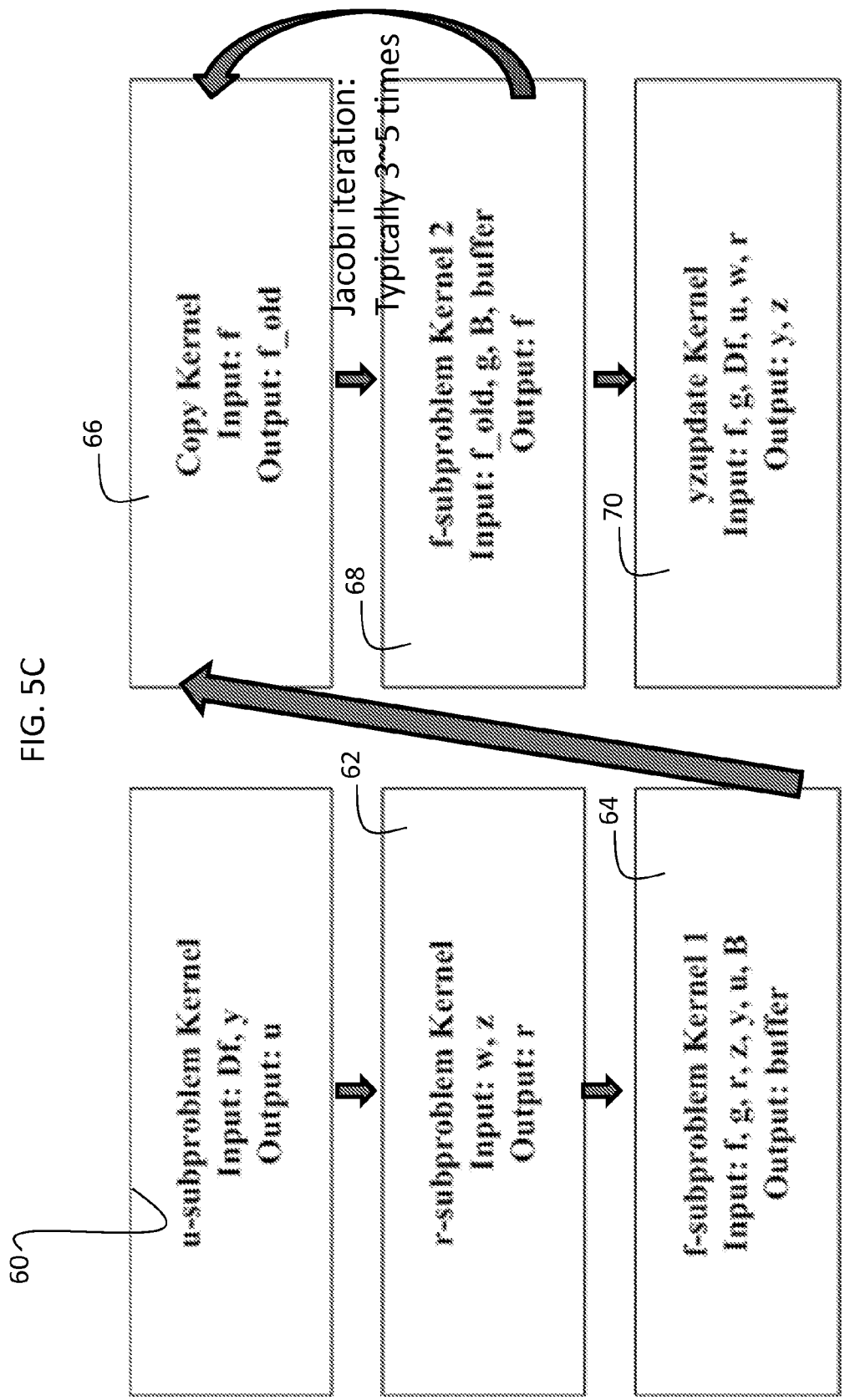

Prior work (discussed below in experimental results as realtimeBP) does message passing as follows. The message passing being used is M_right(x,y)=DataCost(x,y)+M_up(x,y)+M_down(x,y)+M_right(x−1,y). For the right message at pixel(x,y), M_right(x,y) has to wait for M_right(x−1,y) to be computed first otherwise it can't be computed. Therefore, this method cannot accomplish multi-thread computing on the whole image as can the present method. No such dependency happens in the equations above and so the output is completely independent of the input FIGS. 5A-5C illustrate a flow for real time execution of the FIG. 1 method using the census transform, cross aggregation, and occlusion handling and filling. In FIGS. 5A-5C, a left image is input and the output is the horizontal left cross, which creates the horizontal cross construction kernel 30. With the left image a vertical left cross is output to create the vertical cross construction kernel 32. Comparable kernels are constructed using the right images in 34 and 36. Census transform kernels are constructed using left and right images in 38 and 40. The next is a loop that runs the distance function kernel 42, horizontal cross aggregation kernel 44 and vertical kernel 46 to produce an output three-dimensional error map.

The select disparity kernel 48 uses the three-dimensional error map and outputs left and right disparity maps, which are cross-checked and output with occlusion labeling on one via the cross-check kernel 50. Voting kernels 52 and 54 output results for selecting pixels for occlusion handling, and the filling kernels the end initial disparity estimate from 14 in FIG. 1.

FIG. 5C illustrates the sub-problems for the solution that is specified above for the Lagrangian+Jacobi Iteration. The kernels 60-70 are labeled according to the specific sub-problems above. Typically, the flow of FIG. 5C will run about 20 times.

EXPERIMENTAL DATA

In a preferred experimental implementation, the input stereo images are split into the top half and the bottom half, and apron pixels are assigned to each half of the image to reduce error in borders. This is to address the problem cause by dual cores. Two GPUs cannot communicate with each other going through CPU, and going through CPU is slow. Therefore, a preferred method does not allow them to communicate during the disparity estimation process. Splitting the images allows treating it as each GPU computing a different image independently. For example, assume splitting of the image without assigning apron pixels, which is (0~w,0~h/2) and (0~w,h/2~h). During aggregation in the initial disparity section, pixel (any x, h/2) will have no information from (any x, h/2+a positive number), where pixel (any x, h/2) will have information from (any x, h/2+a positive number) if the image wasn't split. Apron pixels is assigned in order to reduce this effect.

The system achieved around 25 fps with the GPU GTX 580 from NVIDIA for 1920×1080, which has 512 streaming processors cores.

Among all 119 reported methods on the Middlebury Stereo database, Table 1 below compares the result of the present methods with top ranked real-time and semi real-time methods. The performance of the methods are listed in ascending order of the average percentage of bad pixels (Ave). The present method ranked first in real-time (20+fps) methods, and rank ninth overall.

TABLE 1

| Algorithm | Tsukuba | | | Venus | | | Teddy | | | Cones | | | Avg | Fps |
|---|---|---|---|---|---|---|---|---|---|---|---|---|---|---|
| | nocc | all | disc | nocc | all | disc | nocc | all | disc | nocc | all | disc | | |
| ADCensus | 1.07 | 1.48 | 5.73 | 0.09 | 0.25 | 1.15 | 4.10 | 6.22 | 10.9 | 2.42 | 7.25 | 6.95 | 3.97 | 10 |
| Our method | 1.30 | 1.85 | 6.22 | 0.25 | 0.67 | 2.00 | 4.31 | 10.1 | 11.7 | 2.37 | 7.78 | 7.04 | 4.63 | 25 |
| CostFilter | 1.51 | 1.85 | 7.61 | 0.20 | 0.39 | 2.42 | 6.16 | 11.8 | 16.0 | 2.71 | 8.24 | 7.66 | 5.55 | 15 |
| RealtimeBFV | 1.71 | 2.22 | 6.74 | 0.55 | 0.87 | 2.88 | 9.90 | 15.0 | 19.5 | 6.66 | 12.3 | 13.4 | 7.65 | 16 |
| RealtimeBP | 1.49 | 3.40 | 7.87 | 0.77 | 1.90 | 9.00 | 8.72 | 13.2 | 17.2 | 4.61 | 11.6 | 12.4 | 7.69 | 5 |
| RealtimeGPU | 2.05 | 4.22 | 10.6 | 1.92 | 2.98 | 20.3 | 7.23 | 14.4 | 17.6 | 6.41 | 13.7 | 16.5 | 9.82 | 8 |
| DCBgrid | 5.90 | 7.26 | 21.0 | 1.35 | 1.91 | 11.2 | 10.5 | 17.2 | 22.2 | 5.34 | 11.9 | 14.9 | 10.9 | 30+ |

ADCensus—X. Mei et al, "On building an accurate stereo matching system on graphics hardware." GPUCV 2011.

Cost Filter—Christoph Rhemann et al, "Fast cost-volume filtering for visual correspondence and beyond", Computer Vision and Pattern Recognition Proceedings 2011;

RealtimeBFV—K. Zhang, J. Lu, and G. Lafruit, "Cross-based local stereo matching using orthogonal integral images," IEEE Trans. Circuits and Systems for Video Technology, vol. 19, no. 7, pp. 1073-1079, July 2009;

RealtimeBP—Q. Yang, L. Wang, R. Yang, S. Wang, M. Liao, and D. Nistér, "Real-time global stereo matching using hierarchical belief propagation," BMVC 2006.

RealtimeGPU—L. Wang, M. Liao, M. Gong, R. Yang, and D. Nistér, "High-quality real-time stereo using adaptive cost aggregation and dynamic programming." 3DPVT 2006.

DCBGrid—Christian Richardt et al, "Real-time spatiotemporal stereo matching using the dual-cross-bilateral grid", European conference on computer vision conference on Computer vision 2010. Results for Cost Filter and DCBgrid was obtained using source code from the author's websites. The websited of Richardet et al, provides synthetic stereo video sequences "Book", "Street", "Tanks", "Temple", and "Tunnel" for public use. These sequences were also used to evaluate performance of the experimental version of the invention. The numerical comparison reveal significantly better performance as shown in Table 2 below.

TABLE 2

| | Book (41) | Street (100) | Tanks (100) | Temple (100) | Tunnel (100) | Avg |
|---|---|---|---|---|---|---|
| Our method | 1.75 | 4.80 | 4.33 | 5.16 | 6.00 | 4.23 |
| CostFilter | 1.77 | 7.02 | 3.90 | 6.77 | 6.55 | 5.20 |
| DCBgrid | 2.84 | 9.32 | 3.52 | 5.14 | 6.43 | 5.45 |
| RealtimeBP | 14.3 | 10.6 | 11.1 | 10.8 | 10.0 | 11.4 |

Nonideal sequences were also tested and evaluated quantitatively. The present system showed better performance for a compressed stereo movie trailer, stereo footage from a Davinci surgery system, and stereo video captured from everyday life.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for disparity estimation of stereo video data, comprising:
receiving a sequence of frames of stereo video data;
initially conducting image-based disparity estimation to produce initial disparity estimates independently for each pixel in each frame of the sequence of frames, wherein said initial disparity estimation produces disparity estimates via a thread process in which an output is independent of the input for each step of the process;
refining disparity estimates in a space-time volume, wherein refining comprises minimizing disparity in the space time volume, and wherein said minimizing comprises minimizing a variable:

$$\min_f \mu \|f - g\|_1 + \|Df\|_2$$

where $\|Df\|_2$ is defined as:

$$\|Df\|_2 \stackrel{def}{=} \sum_i \sqrt{\beta_x^2 |D_x f|_i^2 + \beta_y^2 |D_y f|_i^2 + \beta_t^2 |D_y f|_i^2}.$$

And Dx, Dy, and Dt are forward difference operators and ($\beta x$, $\beta y$, $\beta t$) are scaling parameters and where $\|f-g\|_1$ is a measurement of the difference between the optimization variable f and the observed disparity g.

2. The method of claim 1, wherein the initial disparity estimation further comprises smoothing the initial disparity estimates.

3. The method of claim 1, wherein said minimizing comprises solving an equivalent constrained minimization problem.

4. A method for disparity estimation of stereo video data, comprising:
receiving a sequence of frames of stereo video data;
initially conducting image-based disparity estimation to produce initial disparity estimates, wherein said initial disparity estimation produces disparity estimates via a thread process in which an output is independent of the input for each step of the process;
refining disparity estimates in a space-time volume, wherein said initially conducting comprises converting pixels into gray-scale and then constructing an m×m sliding window over each pixel, then for each m×m block, conducting a census transform that maps intensity values to a bit vector by performing a boolean comparisons between a center pixel intensity and its neighborhood pixels, and if the surrounding pixel has a lower value than the center pixel, the bit is set to 0;

otherwise the bit is set to 1, wherein a cost between two blocks is determined and then a sampling insensitive absolute is used to compute the color cost between pixels by considering the subpixels and then generating an initial disparity estimate as a three-dimensional error map based upon a range of disparity at each pixel.

5. The method of claim 4, wherein the initial disparity estimation is conducted via census transformation and occlusion handling and filling that produces a result independently for each pixel.

6. The method of claim 5, wherein said refining enforces sparsity of a spatial and temporal gradient in the space-time volume.

7. The method of claim 4, wherein the initial disparity estimation is conducted via a combination of pixel ordering and color intensity to determine a correspondence map that minimizes error for a distance function.

8. The method of claim 4, further comprising conducting cross-based aggregation on the initial disparity estimates to enhance spatial smoothness.

9. The method of claim 4, wherein said initial disparity estimation and refining are conducted using multiple threads in a GPU such that blocks to be processed are distributed randomly to idle processor cores.

10. The method of claim 4, wherein each block being processed utilizes shared memory and separate registers for each thread being processed.

11. The method of claim 4, implemented by computer code stored on a non-transient medium.

12. The method of claim 8, implemented by a video codec and GPU.

13. A method for disparity estimation of stereo video data, comprising:
  receiving a pair of video sequences $I_L(x)$ and $I_R(x)$ where $x=(x,y)$;
  for images in the video sequences, conducting a census transform to determine a cost
  $$\text{Cost}_{CT}(I_L(x), I_R(x)) = \text{hamming}(\text{census}(I_L(x)), \text{census}(I_L(x)));$$
  defining a distance function as:
  $$dist(I_L(x), I_R(x)) = \frac{1}{2}\left(1 - \exp\left(-\frac{Cost_{CT}(I_L(X), I_R(X))}{\lambda_{CT}}\right) + 1 - \exp\left(-\frac{Cost_{BT}(I_L(X), I_R(X))}{\lambda_{BT}}\right)\right)$$
  and at each pixel location (x,y), a range of disparity $d \in \{d_{min}, \ldots, d_{max}\}$ is tested and a three-dimensional error map
  $$\epsilon(x;d) = dist(I_L(x+d(x)), I_R(x))$$
  is generated;
    conducting cross based aggregation on the three dimensional error map and setting disparity that minimizes cost at each pixel location $x_p$;
  conducting occlusion handling and filling on the error map using a left right consistency check to detect unreliable pixels; and
  refining disparity maps using following minimization problem
  $$\underset{f}{\text{minimize}}\ \mu\|f - g\|_1 + \|Df\|_2$$
  where g=vec(g(x, y, t)) and f=vec(f(x, y, t)) are the initial disparity and the optimization variable, respectively, and term $\|Df\|_2$ denotes the total variation norm; and
  refining a group of disparity estimates in a space-time volume.

14. The method of claim 13, implemented by computer code stored on a non-transient medium.

15. The method of claim 13, implemented by a video codec and GPU.

\* \* \* \* \*